United States Patent [19]

Hayashi et al.

[11] 3,922,301

[45] Nov. 25, 1975

[54] SULPHONIC ACID DERIVATIVES OF PROSTAGLANDINS

[75] Inventors: Masaki Hayashi; Seiji Kori, both of Takatsuki; Yoichi Iguchi, Amagasaki, all of Japan

[73] Assignee: Ono Pharmaceutical Co., Ltd., Osaka, Japan

[22] Filed: June 14, 1974

[21] Appl. No.: 479,341

[30] Foreign Application Priority Data
June 19, 1973 United Kingdom............... 29070/73

[52] U.S. Cl. .......... 260/503; 260/345.9; 260/347.2; 260/501.19; 260/501.21; 424/315
[51] Int. Cl.² ........................................ C07C 143/00
[58] Field of Search........... 260/503, 501.19, 501.21

[56] References Cited
UNITED STATES PATENTS
3,772,350  11/1973  Pike et al. ........................ 260/488 R

*Primary Examiner*—James O. Thomas, Jr.
*Assistant Examiner*—Nicky Chan
*Attorney, Agent, or Firm*—Albert H. Graddis; Frank S. Chow

[57] ABSTRACT

Prostaglandin sulphonic acid derivatives of the formula:

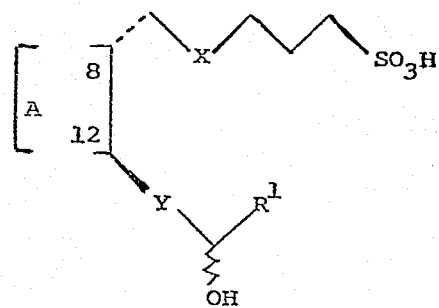

wherein A represents a grouping of the formula:

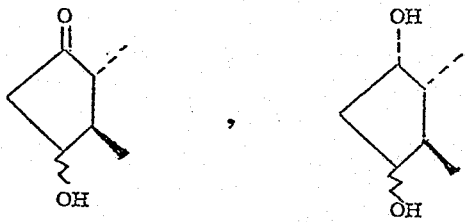

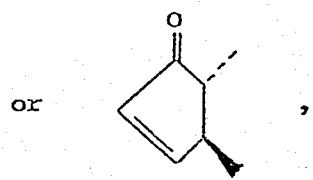

or

VII

X represents cis-vinylene or ethylene. Y represents trans-vinylene or ethylene, R¹ represents a straight- or branched-chain alkyl group containing from 5 to 7 carbon atoms, and indicates attachment of the hydroxy radical to the carbon atom in the alpha or beta configuration and the corresponding cyclodextrin clathrates and non-toxic salts thereof are disclosed. These compounds exhibit characteristic prostaglandin-like activity.

9 Claims, No Drawings

SULPHONIC ACID DERIVATIVES OF PROSTAGLANDINS

This invention relates to new prostaglandin analogues, to a process for their preparation and to pharmaceutical compositions containing them.

Prostaglandins are derivatives of prostanoic acid which has the following formula:

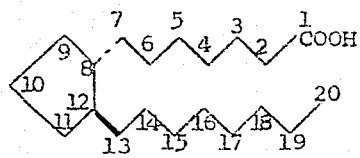

Various types of prostaglandins are known, the types depending inter alia on the structure and substituents on the alicyclic ring. For example, the alicyclic rings of prostaglandins E(PGE), F(PGF) and A(PGA) have the structures:

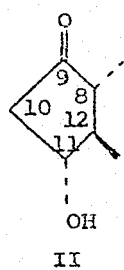 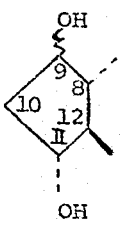 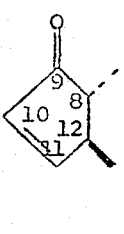

respectively.

Such compounds are sub-classified according to the position of double bond(s) in the side chain(s) attached to the 8- and 12-positions of the alicyclic ring. Thus PG-1 compounds have a trans-double bond between $C_{13}$—$C_{14}$(trans-$\Delta^{13}$), PG-2 compounds have a cis-double bond between $C_5$—$C_6$ and a trans-double bond between $C_{13}$—$C_{14}$(cis-$\Delta^5$, trans-$\Delta^{13}$), and PG-3 compounds have cis-double bonds between $C_5$—$C_6$ and $C_{17}$—$C_{18}$ and a trans-double bond between $C_{13}$—$C_{14}$(cis-$\Delta^5$, trans-$\Delta^{13}$, cis-$\Delta^{17}$). For example, prostaglandin $F_{1\alpha}$ ($PGF_{1\alpha}$) and prostaglandin $E_1$ ($PGE_1$) are characterized by the following structures V and VI.

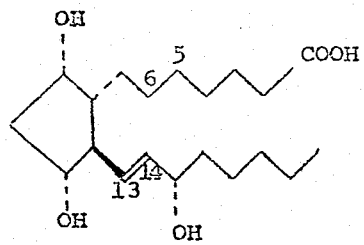

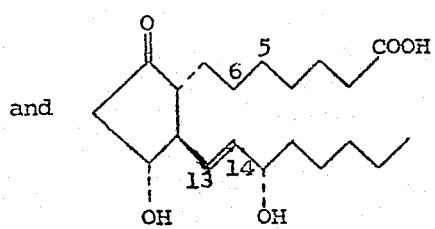

respectively. The structures of $PGF_{2\alpha}$ and $PGE_2$, as members of the PG-2 group, correspond to those of formulae V and VI respectively with a cis-double bond between the carbon atoms in positions 5 and 6. Compounds in which the double bond between the carbon atoms in positions 13 and 14 of members of the PG-1 group is replaced by ethylene(—$CH_2CH_2$—) are known as dihydro-prostaglandins, e.g. dihydro-prostaglandin-$F_{1\alpha}$ (dihydro-$PGF_{1\alpha}$) and dihydro-prostaglandin-$E_1$ (dihydro-$PGE_1$).

Moreover, when one or more methylene groups are added to the aliphatic group attached to the 12-position of the alicyclic ring of the prostaglandins the compounds are known, in accordance with the usual rules of organic nomenclature, as $\omega$-homo-prostaglandins and, when more than one methylene group is added, the number is indicated by di-, tri- etc. before the prefix "homo".

Prostaglandins are generally known to possess pharmacological properties, for example they stimulate smooth muscle, have hypotensive, diuretic, bronchodilating and antilipolytic activities, and also inhibit blood platelet aggregation and gastric acid secretion, and are, accordingly, useful in the treatment of hypertension, thrombosis, asthma and gastro-intestinal ulcers, in the induction of labour and abortion in pregnant female mammals, in the prevention of arteriosclerosis, and as diuretic agents. They are fat-soluble substances obtainable in very small quantities from various tissues of animals which secrete the prostaglandins in the living body.

For example, PGE's and PGA's have an inhibiting effect on gastric acid secretion and may, accordingly, be used in the treatment of gastric ulcers. They also inhibit the release of free fatty acids induced by epinephrine and as a result they reduce the concentration of free fatty acid in blood, and are, accordingly, useful in the prevention of arteriosclerosis. $PGE_1$ inhibits blood platelet aggregation and also removes the thrombus and prevents thrombosis. PGE's and PGF's have a stimulating effect on smooth muscle and increase the intestinal peristalsis; these actions indicate therapeutic utility on post-operative ileus and as purgatives. Furthermore, PGE's and PGF's may be used as oxytocics, as abortifacients in the first and second trimesters; in the post-labour abortion of the placenta, and as oral contraceptives because they regulate the sexual cycle of female mammals. PGE's and PGA's have vasodilator and diuretic activities. PGE's are useful for improvement in patients suffering from cerebral vascular disease because they increase the cerebral blood flow, and are also useful in the treatment of asthmatic conditions in patients because of their bronchodilating activity.

During the past decade widespread investigations have been carried out in order to discover inter alia new products possessing the pharmacological properties of the 'natural' prostaglandins or one or more of such properties to an enhanced degree, or hitherto unknown pharmacological properties. It has now been found that by substituting a sulpho radical (i.e. —$SO_3H$) for the carboxy radical of prostaglandins E, F and A and certain analogues thereof the pharmacological properties of natural prostaglandins may, in some aspects of their activities, be improved or modified, and the new compounds are water-soluble and readily obtainable in crystalline form.

The present invention accordingly provides new prostaglandin analogues of the general formula:

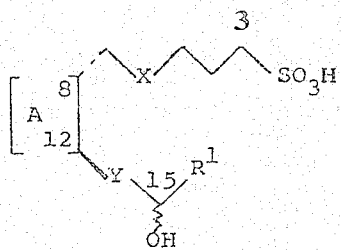

VII

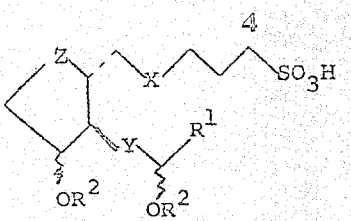

IX (wherein A represents a grouping of formula IV indicated above or a grouping of the formula:

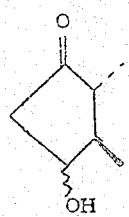 or 

VIIIA     VIIIB

X represents cis-vinylene (i.e. —CH=CH—) or ethylene (i.e. —CH$_2$CH$_2$—) and Y represents trans-vinylene or ethylene, and R$^1$ represents a straight- or branched-chain alkyl group containing from 5 to 7 carbon atoms, preferably an n-pentyl group) and cyclodextrin clathrates and non-toxic (e.g. sodium) salts thereof. The symbol $\sim$ in general formula VII and in other formulae throughout this specification indicates attachment of the group in question in the α- and β-configuration, preferably in the α-configuration.

The present invention is concerned with all compounds of general formula VII in the natural form or its enantiomeric form, or mixtures thereof, more particularly the racemic form consisting of equimolecular mixtures of natural and its enantiomeric form.

As will be apparent to those skilled in the art, the compounds depicted in general formula VII have at least three centres of chirality, these three centres of chirality being at the alicyclic ring carbon atoms of group A identified as 8 and 12 and at the C—15 carbon atom which has attached to it a hydroxy group. Still further centres of chirality occur when the alicyclic group A carries a hydroxy group on the carbon atom in position 11 (i.e. when the ring is that of formula VIIIA) or hydroxy groups in positions 9 and 11 (i.e. when the ring is that of formula VIIIB) and further centres of chirality may occur in alkyl groups represented by the symbol R$^1$. The presence of chirality leads, as is well known, to the existence of isomerism. However, the compounds of general formula VII all have such a configuration that the side-chains attached to the ring carbon atoms in the positions identified as 8 and 12 are trans with respect to each other. Accordingly, all isomers of general formula VII, and mixtures thereof, which have those side-chains attached to the ring carbon atoms in positions 8 and 12 in the trans-configuration and have a hydroxy group as depicted in the 15-position are to be considered within the scope of general formula VII.

According to a feature of the present invention, the prostaglandin analogues of general formula VII, wherein A represents a grouping of formula VIIIA or VIIIB and the other symbols are as hereinbefore defined, are obtained by the process which comprises hydrolysing to hydroxy groups the groups OR$^2$ of a compound of the general formula:

(wherein X, Y and R$^1$ are as hereinbefore defined, Z represents $C\!\!\begin{smallmatrix}\text{CH}\\\text{H}\end{smallmatrix}$ or C=O and R$^2$ represents a 2-tetrahydropyranyl group unsubstituted or substituted by at least one alkyl group, or a 2-tetrahydrofuranyl or 1-ethoxyethyl group) or an alkali metal (e.g. sodium) salt thereof to obtain a PGF or PGE compound of the general formula:

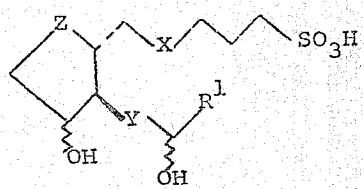

X (wherein X, Y, R$^1$ and Z are as hereinbefore defined) or an alkali metal salt thereof, and, if desired, converting by methods known per se the PGE alicyclic ring of a compound of general formula X (Z represents C=O), or an alkali metal salt thereof, to that of a PGA compound. By the term 'methods known per se' as used in this specification is meant methods heretofore used or described in the chemical literature.

The OR$^2$ groups of the compounds of general formula IX may be converted to hydroxy groups by mild hydrolysis with an aqueous solution of an organic acid, e.g. acetic acid or trifluoroacetic acid, or with a dilute aqueous inorganic acid, e.g. hydrochloric acid or sulphuric acid, in the presence of an organic solvent miscible with water, e.g. tetrahydrofuran or an alkanol containing from 1 to 4 carbon atoms, e.g. methanol. The mild hydrolysis may be carried out at a temperature ranging from ambient to 60°C. (preferably at a temperature below 45°C.) with an acid mixture, e.g. a mixture of trifluoroacetic acid and methanol, acetic acid, water and tetrahydrofuran, or a mixture of hydrochloric acid with tetrahydrofuran or methanol.

The PGE compounds of general formula X (Z represents C=O) can be converted into the corresponding PGA compounds by subjecting the PGE's to dehydration using an aqueous solution of an organic or inorganic acid having a higher concentration than that employed for hydrolysing the OR$^2$ groups of compounds of general formula IX, e.g. 1N hydrochloric acid or acetic acid, and heating at a temperature of 30°–65°C, more particularly at 55°–65°C.

If desired, simultaneous hydrolysis and dehydration under acid conditions as hereinbefore described may be effected on compounds of general formula IX wherein Z represents C=O and the other symbols are as hereinbefore defined, or an alkali metal salt thereof, to produce directly PGA compounds of general formula VII wherein A represents a group of formula IV.

Compounds of general formula IX, wherein Z represents C=O and the other symbols are as hereinbefore defined, may be obtained by converting by methods known per se the 9α-hydroxy group of a compound of the general formula:

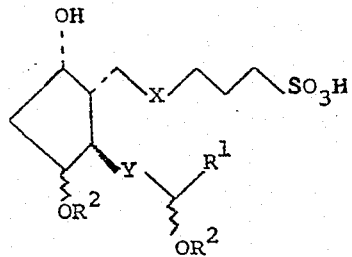

XI (wherein X, Y, $R^1$ and $R^2$ are as hereinbefore defined, i.e. a compound of general formula IX wherein Z represents

or an alkali metal, e.g. sodium, salt thereof, to an oxo group, for example by means of a chromic acid solution (e.g. obtained from chromium trioxide, manganese sulphate, sulphuric acid and water) or Jones' reagent, i.e. chromium trioxide and sulphuric acid in water. With Jones' reagent the oxidation can be effected in a suitable solvent medium, e.g. acetone, at a low temperature, e.g. about 0° to −50°C.

The intermediate compounds of general formula IX, which embraces compounds of general formula XI, are new compounds and as such constitute, together with their processes of preparation as hereinafter described, features of the present invention. The intermediates of general formula IX may thus be converted into the prostaglandin analogues of general formula VII by the reactions depicted schematically below in Scheme A.

SCHEME A

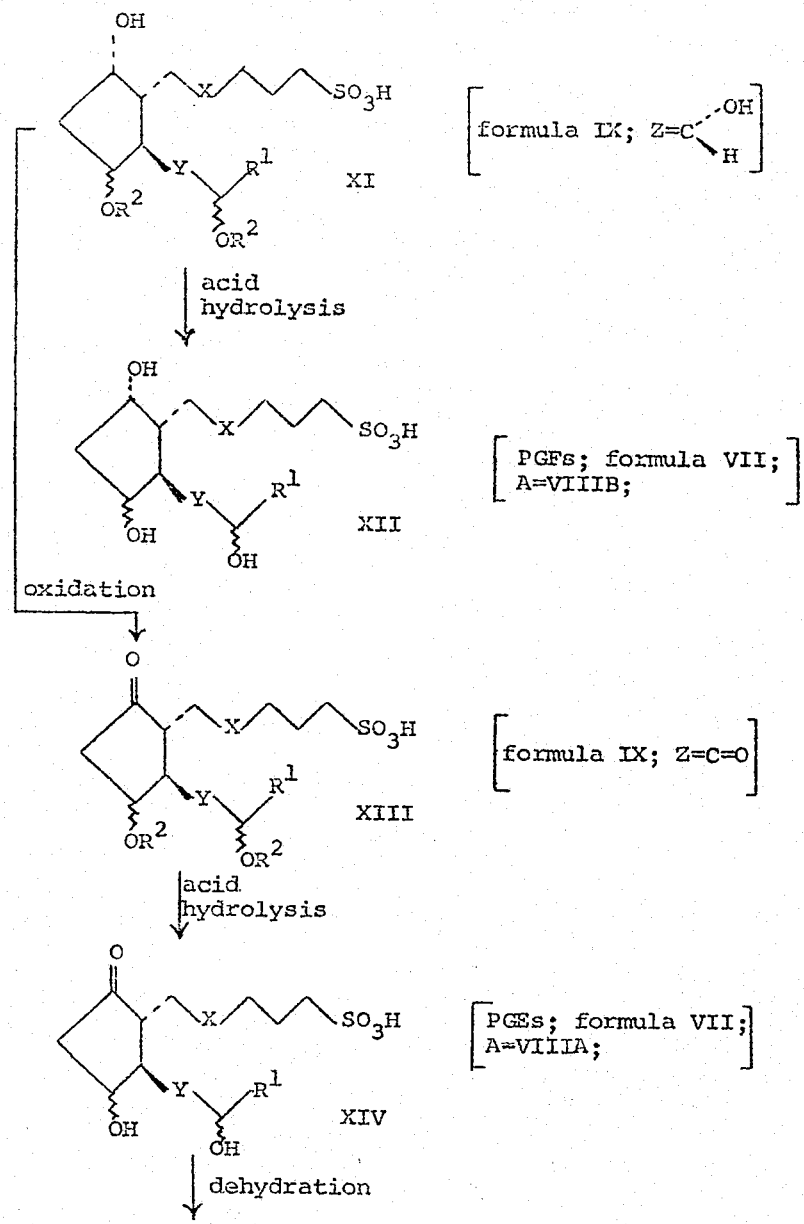

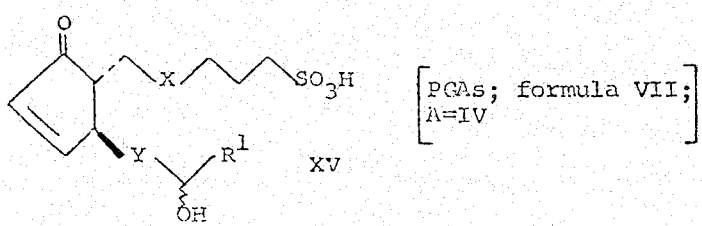

[PGAs; formula VII; A=IV]

wherein the various symbols are as hereinbefore defined. It is to be understood that the compounds of the depicted formulae may be present as such or in the form of an alkali metal, e.g. sodium, salt.

Compounds of general formula XI and alkali metal, e.g. sodium, salts thereof may be prepared by reacting a bicyclo-octane derivative of the general formula:

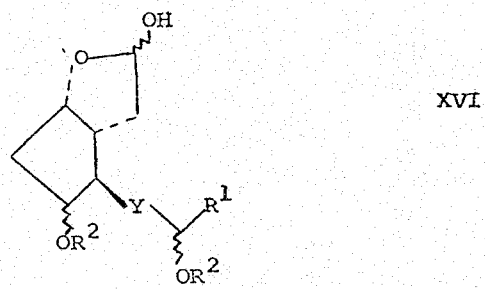

(wherein Y, $R^1$ and $R^2$ are as hereinbefore defined) with a compound of the formula:

$(C_6H_5)_3P=CH.CH_2CH_2CH_2SO_3H$  XVII or an alkali metal salt thereof, for example (4-sodium sulphonato-n-butylidene)-triphenylphosphorane, to obtain a compound of the general formula:

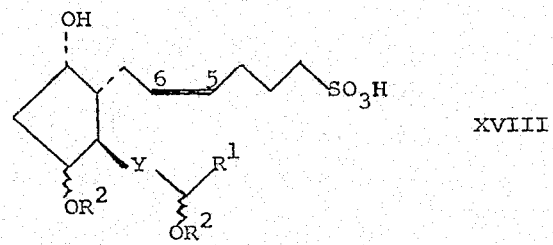

(wherein Y, $R^1$ and $R^2$ are as hereinbefore defined) and optionally catalytically hydrogenating (1) the cis-double bond between $C_{5-6}$ and (2) when present a trans-double bond between $C_{13-14}$ represented by the symbol Y.

The reaction between the bicyclo-octane derivatives of general formula XVI and the triphenyl-phosphorane compound is carried out under the normal conditions utilized for effecting the Wittig reaction, e.g. in an inert solvent. The reaction is preferably carried out in dimethylsulphoxide because the phosphorane compound is practically insoluble in other solvents, e.g. tetrahydrofuran, and because a cis-double bond must be formed stereospecifically in the Wittig reaction. For the better performance of the Wittig reaction, more than two molecular equivalents of the phosphorane compound are required for each mole of the bicyclo-octane reactant. The reaction is generally effected at a temperature of 0°–40°C., preferably at 20°–30°C., and is usually complete after about one to four hours at laboratory temperature. Preferably an alkali metal, e.g. sodium, salt of the compound of formula XVII is used and the product of general formula IX is isolated from the reaction mixture in the form of an alkali metal salt.

The acid product of formula XVIII may be extracted from the reaction mixture by conventional procedures, optionally after neutralisation of the mixture with dilute sulphuric acid, and further purified by column chromatography on silica gel.

Catalytic hydrogenation of the compounds of general formula XVIII, or an alkali metal salt thereof, can be carried out as follows:

The hydrogenation catalyst, i.e. a catalyst usually used for the hydrogenation of double bonds such as various forms of platinum, palladium (e.g. 5% palladium on charcoal) or nickel, is suspended in an adequate amount of a solvent acting as reaction medium, and the suspension placed in an apparatus appropriate for a catalytic reduction process. The air inside the apparatus is replaced by hydrogen, and a solution of the compound of general formula XVIII in a suitable inert solvent (for example methanol, ethanol, water, dioxan or acetic acid) is added to the suspension of the catalyst. The reaction takes place at about 0°C. to 50°C., e.g. 20°C., and under normal or elevated pressure, e.g. at a hydrogen pressure from atmospheric to 15 kilograms per square centimeter until one or two times the molar quantity of hydrogen has been consumed according to whether or not it is desired to reduce a trans $C_{13-14}$ double bond represented by the symbol Y in the compound of formula XVIII, as well as the cis $C_5$–$C_6$ double bond, for example for a period of 0.5 to 8 hours. After completion of the reaction, the catalyst is removed by means of a filter and the filtrate concentrated. If necessary, the residue is purified by chromatography using silica gel or silica gel impregnated with silver nitrate.

When a $C_{13-14}$ double bond represented by the symbol Y is present in general formula XVIII and it is desired to reduce it, the $C_{13-14}$ double bond is difficult to hydrogenate due to steric hindrance by the tetrahydropyranyloxy, tetrahydrofuranyloxy or ethoxyethoxy group $OR^2$; however, use of platinum oxide as catalyst is satisfactory for this purpose. The optional hydrogenation of the $C_{5-6}$ double bond only in the compound of general formula XVIII can be effected by appropriate selection of the catalyst (5% palladium on charcoal is satisfactory), the reaction temperature and time.

The compounds of general formula XVI, wherein Y, $R^1$, $R^2$ and ⁓ are as hereinbefore defined, are either known compounds whose preparation is described in the chemical literature or may be obtained by the application or adaptation of known methods, for example as described in J. Amer. Chem. Soc., 91, 5675 (1969) and 92, 397 (1970) and Belgian Pat. Nos. 782822 and 805111. More particularly, the compounds of general formula XVI, wherein Y represents trans-vinylene, $R^1$ represents n-pentyl, $R^2$ represents 2-tetrahydropyranyl and ⁓ is in α-configuration, is a known compound whose preparation is described in J. Amer. Chem. Soc., 91, 5675 (1969) (racemic form) and 92, 398 (1970) (natural form). The compounds of general formula XVI, wherein Y represents trans-vinylene, $R^1$ represents 1-methyl-n-pentyl, 1,1-dimethyl-n-pentyl or 1-ethyl-n-pentyl, $R^2$ represents 2-tetra-hydropyranyl and is in α-configuration, are known compounds whose preparation is described in Belgian Pat. No. 782822. The compounds of general formula XVI, wherein Y represents ethylene and $R^1$, $R^2$ and ~~ are as hereinbefore defined, are described in Belgian Pat. No. 805111.

The bicyclo-octane derivatives of general formula XVI can be prepared by the reaction sequence depicted schematically below in Scheme B.

In carrying out the reactions depicted in Scheme B, the phosphonates of general formula XX are initially converted to corresponding ylides by reaction with sodium hydride or lithium hydride in tetrahydrofuran, and the bicyclo-octane compound of general formula XIX, in solution in tetrahydrofuran, is added to the ylide solution, and the ensuing Wittig reaction carried out at or about ambient temperature yields stereospecifically compounds of general formula XXI with a trans double bond. The compounds of general formula XXI are then reduced with zinc borohydride in dimethoxyethane or sodium borohydride in methanol to give

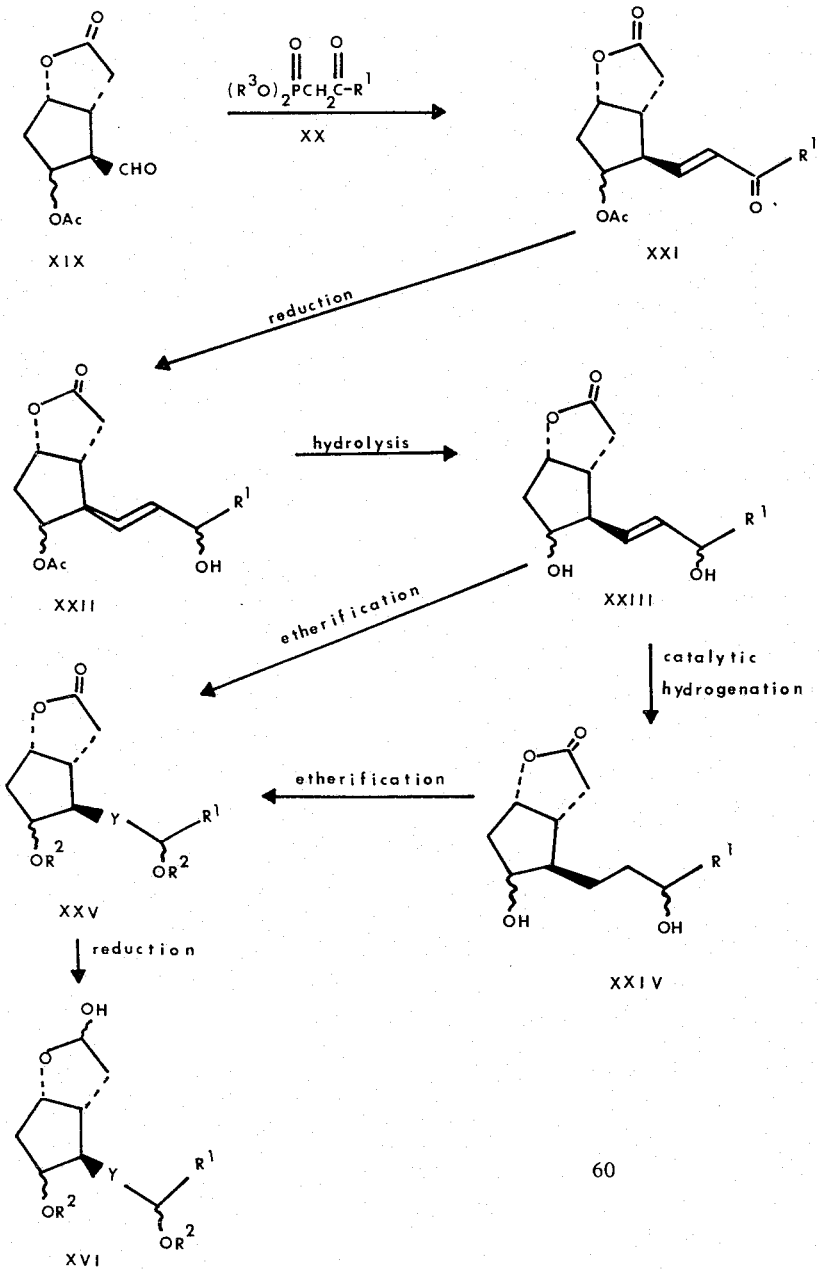

SCHEME B wherein Ac represents an acetyl group $R^3$ represents a methyl or ethyl group and $R^1$ and $R^2$ are as hereinbefore defined.

compounds of general formula XXII, the α- and β- hydroxy isomers of which can, if desired, be separated by column chromatography. Hydrolysis of compounds of general formula XXII with, for example, an equimolar amount of anhydrous potassium carbonate in methanol at ambient temperature gives the diols of general formula XXIII. The trans double bond of a diol of general formula XXIII may, if desired, be reduced by catalytic hydrogenation utilising the procedures hereinbefore described for the catalytic hydrogenation of compounds of general formula XVIII, to give compounds of general formula XXIV.

Compounds of general formulae XXIII and XXIV are then etherified to introduce the groups $R^2$ ($R^2$ being as hereinbefore defined), for example by reaction with the dihydropyran, dihydrofuran or ethyl vinyl ether in mathylene chloride using p-toluenesulphonic acid as catalyst. Reduction of the ethers of fromula XXV thus obtained is then effected with diisobutylaluminium hydride in toluene at a low temperature, e.g. −60°C, and for 15–30 minutes to give the compounds of general formula XVI.

The compounds of general formula XIX wherein the group represented by OAc is in α-configuration are known compounds, the racemic form of the α-configuration compound being described in J. Amer. Chem. soc., 91, 5675 (1969) and the natural configuration form of the α-configuration compound being described in J. Amer. Chem. Soc., 92, 397 (1970). A method for the preparation of the compound of general formula XIX wherein the group represented by —OAc is in β-configuration, utilizing known procedures, may be represented by the series of reactions depicted schematically below in Scheme C (of E. J. Corey and Shiro Terashima, Tetrahedron Letters, No. 2, p.p. 111–113, 1972).

SCHEME C

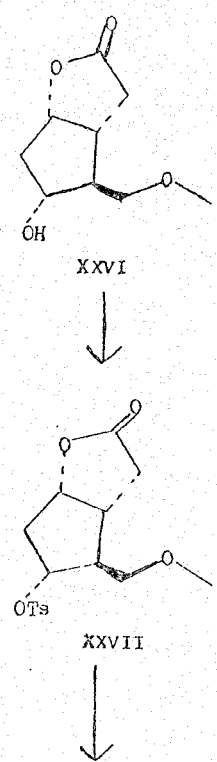

XXVI

XXVII

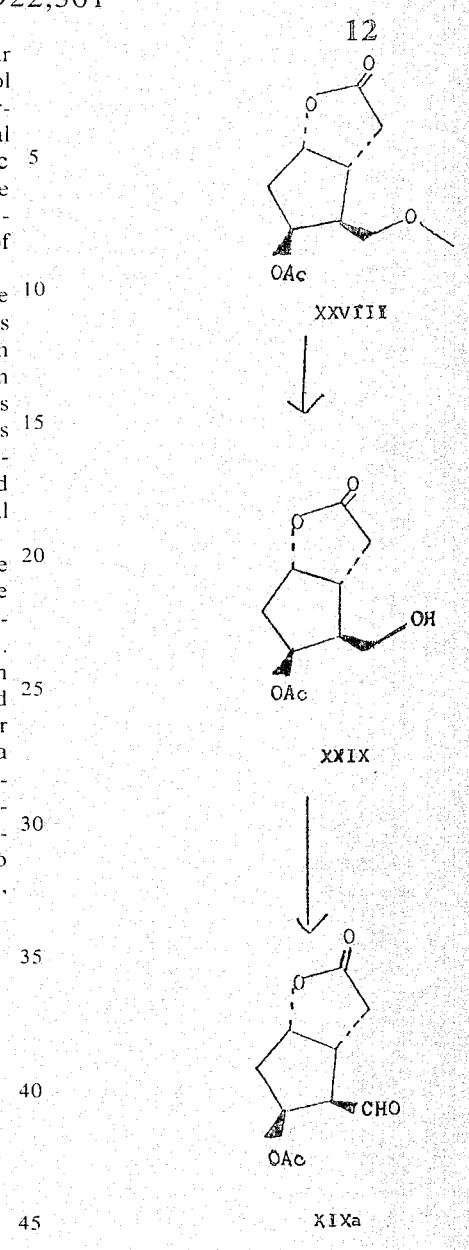

XXVIII

XXIX

XIXa wherein Ac is as hereinbefore defined and Ts represents the tosyl group. The various reactions depicted above in Scheme C may be effected by methods known per se. Compounds of formula XXVIII may be prepared by reacting compounds of formula XXVII with tetramethylammonium acetate. The compounds of formula XXIX may be converted to compounds of formula XIXa under mild and neutral conditions, e.g. with chromium trioxide-pyridine complex or Jones' reagent and at a moderately low temperature.

The compound of formula XVII and its alkali metal, e.g. sodium, salts, for example (4-sodium sulphonato-n-butylidene)-triphenylphosphorane, may be prepared by reacting a compound of the general formula:

$$[(C_6H_5)_3P^+(CH_2)_4SO_3H]Z \qquad XXX$$

(wherein Z represents a chlorine or bromine atom) or an alkali metal, e.g. sodium, salt thereof, for example (4-sodium sulphonato-n-butyl)triphenylphosphonium bromide, with an alkali metal methylsulphinylcarbanide, e.g. sodiomethylsulphinylcarbanide. The reaction is preferably carried out in an inert solvent, for example dimethylsulphoxide, at ambient temperature.

The compounds of general formula XXX may be prepared by reacting a compound of the general formula:
Z(CH$_2$)$_4$SO$_3$H     XXXI
wherein Z is as hereinbefore defined, or an alkali metal, e.g. sodium, salt thereof, with triphenylphosphine in a suitable organic solvent, e.g. N,N-dimethylformamide, at a temperature of 70° to 150°C. for a period ranging from 7 hours to 3 days.

Salts may be prepared from the compounds of general formula VII, by methods known per se, for example by reaction of stoichiometric quantities of compounds of general formula VII and the appropriate base, e.g. an alkali metal hydroxide or carbonate, ammonium hydroxide, ammonia or an amine, in a suitable solvent. The salts may be isolated by concentration of the solution or, if sufficiently insoluble in the reaction medium, by filtration, if necessary after removal of part of the solvent. Preferably the salts are non-toxic salts, i.e. salts the cations of which are relatively innocuous to the animal organism when used in therapeutic doses so that the beneficial pharmacological properties of the prostaglandin analogues of general formula VII are not vitiated by side-effects ascribable to those cations. Preferably the salts are water-soluble. Suitable salts include the alkali metal, e.g. sodium and potassium, and ammonium salts and pharmaceutically-acceptable (i.e. non-toxic) amine salts. Amines suitable for forming such salts with sulphonic acids are well known and include, for example, amines derived in theory by the replacement of one or more of the hydrogen atoms of ammonia by groups, which may be the same or different when more than one hydrogen atom is replaced, selected from, for example, alkyl groups containing from 1 to 6 carbon atoms and hydroxyalkyl groups containing from 1 to 3 carbon atoms.

The prostaglandin analogues of general formula VII may, if desired, be converted into cyclodextrin clathrates. The clathrates may be prepared by dissolving the cyclodextrin in water and/or an organic solvent which is miscible with water and adding to the solution the cyclopentane compound in a water-miscible organic solvent. The mixture is then heated and the desired cyclodextrin clathrate product isolated by concentrating the mixture under reduced pressure or by cooling and separating the product by filtration or decanting. The ratio of organic solvent to water may be varied according to the solubilities of the starting materials and products. Preferably the temperature is not allowed to exceed 70°C. during the preparation of the cyclodextrin clathrates. α, β or γ-Cyclodextrins or mixtures thereof may be used in the preparation of the cyclodextrin clathrates. conversion into their cyclodextrin clathrates serves to increase the stability of the prostaglandin analogues.

The new compounds of general formula VII and, more particularly, their sodium salts are water-soluble and easily crystallise and are, accordingly, readily made up into pharmaceutical compositions. The new compounds of general formula VII and their cyclodextrin clathrates and non-toxic salts possess the valuable pharmacological properties typical of prostaglandins in a selective fashion including, in particular, stimulatory activity on uterine and intestinal contraction and, at lower doses than those required to produce stimulatory activity on uterine and intestinal contraction and hence selectively in respect of the latter two activities, hypolipidaemic, including hypocholesterolaemic, activity and anti-lipolytic activity and also activity in lowering blood glucose levels. It is believed that activity in lowering blood glucose levels and in lowering blood cholesterol levels has not hitherto been reported in respect of members of the prostaglandin family of compounds. The new compounds of general formula VII and their cyclodextrin clathrates and non-toxic salts thereof are useful in the induction of labour in pregnant female mammals, in the treatment of intestinal dyskinesia and post-operative intestinal paralysis and in the prevention and treatment of constipation and, more especially and at dose levels lower than those required for the aforementioned uses, in the prevention and treatment of hyperlipidaemic states, i.e. elevated blood levels of cholesterol and triglycerides, for example in the treatment of disorders of the peripheral circulation and in the prevention and treatment of myocardial infarctions, cerebral thrombosis and angina pectoris, in the prevention and treatment of elevated blood levels of free fatty acids, e.g. in stress situations after myocardial infarctions which predispose the subject to cardiac arrhythmias, in the prevention of arteriosclerosis and hyperlipemia (i.e. elevated blood levels of triglycerides) and in the treatment of diabetes. At the dose levels required to produce the hereinbefore described beneficial effects, the compounds exhibit no hypotensive activity which would represent an undesired side-effect. In particular, 6-[2β-(3α-hydroxy-oct-trans-l-enyl)-3α, 5α-dihydroxycyclopent-1α-yl]hex-cis-4-enesulphonic acid, 6-[2β-(3α-hydroxy-oct-trans-l-enyl)-3α-hydroxy-5-oxo-cyclopent-1α-yl]hex-cis-4-enesulphonic acid, 6-[2β-(3α-hydroxy-oct-trans-l-enyl)-5-oxo-cyclopent-3-en-1α-yl]hex-cis-4-enesulphonic acid and, more especially, 6-[2β-(3α-hydroxyoct-trans-l-enyl)-3α, 5α-dihydroxycyclopent-1α-yl]hexanesulphonic acid and their cyclodextrin clathrates and non-toxic, e.g. sodium salts, are of value in treatment of disorders of the peripheral circulation and in the prevention and treatment of myocardial infarctions, cerebral thrombosis and angina pectoris, in the prevention and treatment of elevated blood levels of free fatty acids in stress situations after myocardial infarction, in the prevention of arteriosclerosis and hyper-lipemia and in the treatment of hypercholesterolaemia and diabetes. For example, in laboratory screening tests, (1) when administered orally to rats fed on a cholesterol-supplemented diet, sodium 6-[2β-(3α-hydroxyoct-trans-l-enyl)-3α, 5α-dihydroxycyclopent-1α-yl]hex-cis-4-enesulphonate produces a 27% fall in blood cholesterol level in comparison with controls at a dose of 100 μg/kg animal body weight, sodium 6-[2β-(3α-hydroxyoct-trans-l-enyl)-3α-hydroxy-5-oxo-cyclopent-1α-yl]-hex-cis-4-enesulphonate produces a 23% fall in blood cholesterol level and a 14% fall in blood triglycerides level in comparison with controls at a dose of 100 μg/kg animal body weight and a 19% fall in blood cholesterol level and an 8% fall in blood triglycerides level in comparison with controls at a dose of 1 μg/kg animal body weight, sodium 6-[2β-(3α-hydroxyoct-trans-l-enyl)-5-oxo-cyclopent-3-en-1α-yl]hex-cis-4-enesulphonate produces a 15% fall in blood cholesterol level and a 29% fall in blood triglycerides level in comparison with controls at a dose of 100 μg/kg animal body weight and sodium 6-[2β-(3α-hydroxyoct-trans-l-enyl)-3α, 5α-dihydroxycyclopent-1α-yl]hexanesulphonate produces a 43% fall in blood cholesterol level and a 16% fall in blood triglycerides level in comparison with controls at a dose of 100 μg/kg animal body weight and a 48% fall in blood cholesterol level and a 46% fall in blood triglycerides level in comparison with controls at a dose of 1 μg/kg animal body weight; (2) when administered orally to rats fed on a normal diet, sodium 6-[2β-(3α-hydroxyoct-trans-l-enyl)-3α-hydroxy-5-oxo-cyclopent-1α-yl]hex-cis-4-enesulphonate produces, in comparison with controls, falls in blood free fatty acids level of 18% and 19%, respectively, at doses of 100 and 1 μg/kg animal body weight, sodium 6-[2β-(3α-hydroxyoct-trans-l-enyl)-5-oxo-cyclopent-3-en-1α-yl]hex-cis-4-enesulphonate produces a fall of 31% in blood free fatty acids level in comparison with controls at a dose of 100 μg/kg animal body weight and sodium 6-[2β-(3α-hydroxyoct-trans-l-enyl)-3α,5α-dihydroxy-cyclopent-1α-yl]hexanesulphonate produces a fall of 19% in blood free fatty acids level in comparison with controls at a dose of 1 μg/kg animal body weight; (3) when administered orally to the anaesthetised cat previously treated with isoprenaline to raise blood free fatty acids and glucose levels, sodium 6-[2β-(3α-hydroxyoct-trans-l-enyl)-3α-hydroxy-5-oxo-cyclopent-1α-yl]hex-cis-4-enesulphonate produces, in comparison with controls, a 40% fall in blood free fatty acids level and a 10% fall in blood glucose level at a dose of 100 μg/kg animal body weight and sodium 6-[2β-(3α-hydroxyoct-trans-l-enyl)-3α, 5α-dihydroxycyclopent-1α-yl]hexanesulphonate produces, in comparison with controls, a 35% fall in blood free fatty acids level and a 30% in blood glucose level at a dose of 100 μg/kg animal body weight; (4) sodium 6-[2β-(3α-hydroxyoct-trans-l-enyl)-3α, 5 α-dihydroxy-cyclopent-1α-yl]hex-cis-4-enesulphonate produces a stimulatory effect in vitro on the isolated uterus of the ovariectomised rat, producing 50% contraction at a dose of $6.6 \times 10^{-7}$ g/ml, a stimulating effect in vitro on the isolated ileum of the ovariectomised rat, producing 50% contraction at a dose of $1.7 \times 10^{-7}$ g/ml and stimulates uterine activity by intravenous administration causing termination of pregnancy in pregnant rats, the effective dose when administered on the 15th day of gestation being 833.3±166.67 μg/kg animal body weight and the effective dose when administered on the 21st day of gestation being 666.7±166.67 μg/kg animal body weight; (5) when administered orally, sodium 6-[2β-(3α-hydroxyoct-trans-l-enyl)-3α, 5α-dihydroxycyclopent-1α-yl]hex-cis-4-enesulphonate, sodium 6-[2β-(3α-hydroxyoct-trans-l-enyl)-3α-hydroxy-5-oxo-cyclopent-1α-yl]hex-cis-4-enesulphonate, sodium 6-[2β-(3α-hydroxyoct-trans-l-enyl)-5-oxo-cyclopent-3-en-1α-yl]hex-cis-4-enesulphonate and sodium 6-[2β-(3α-hydroxyoct-trans-l-enyl)-3α,5α-dihydroxycyclopent-1α-yl]hexanesulphonate produce, respectively, 15%, 10%, 10% and 35% reduction, in comparison with controls, in morphine-induced constipation in mice at a dose of 100 μg/kg animal body weight, and (6) when administered intravenously to the allobarbital-anaesthetised dog, sodium 6-[2β-(3α-hydroxyoct-trans-l-enyl)-3α-hydroxy-5-oxo-cyclopent-1α-yl]hex-cis-4-enesulphonate produces no fall in blood pressure at a dose of 100 μg/kg animal body weight and sodium 6-[2β-(3α-hydroxyoct-trans-l-enyl)-5-oxo-cyclopent-3-en-1α-yl]hex-cis-4-enesulphonate produces a fall in blood pressure of 8–16 mm.Hg lasting 3–5 minutes at doses of 50–100 μg/kg animal body weight.

The following Examples illustrate the present invention. (In the following Examples, 'IR', 'NMR' and 'TLC' represent, respectively, 'Infrared absorption spectrum', 'Nuclear magnetic resonance spectrum' and 'Thin layer chromatography').

EXAMPLE 1

Sodium 6-[2β-{3α-(2-tetrahydropyranyloxy)-oct-trans-l-enyl}-3α-(2-tetrahydropyranyloxy)-5α-hydroxycyclopent-1α-yl]hex-cis-4-enesulphonate (4-Sodium sulphonato-n-butyl)triphenylphosphonium bromide (10.8 g.), which had been well dried under reduced pressure at 100°C, was dissolved in dimethylsulphoxide (50 ml) and the solution added at ambient temperature to sodiomethylsulphinylcarbanide which had been prepared by heating sodium hydride (1.71g, content 63.9%) and dimethylsulphoxide (20 ml) in a stream of nitrogen gas. After the addition, the yellowish-red reaction mixture was stirred for 5 minutes and a solution of 2-oxa-3-hydroxy-6-syn-[3α-(2-tetrahydropyranyloxy)-oct-trans-1-enyl]-7-anti-(2-tetrahydropyranyloxy)-cis-bicyclo-[3,3,0]octane (4g) in dimethylsulphoxide (20 ml) was added and the mixture stirred at 30°C for 3 hours. The bright reddish reaction mixture was diluted with ten times its volume of ice-water, saturated with sodium chloride and extracted with a 1:1 mixture of ethyl acetate and diethyl ether. The organic layer was washed with brine, dried and concentrated in vacuo. The residue was purified on a silica gel column by elution with a 4:1 mixture of methylene chloride and methanol to give sodium 6-[2β-{3α-(2-tetrahydropyranyloxy)-oct-trans-l-enyl -}3α-(2-tetrahydropyranyloxy)-5α-hydroxycyclopent-1α-yl]hex-cis-4-enesulphonate (2.44g; 48%) as pale yellow crystals, m.p. 178°–180°C. NMR (deuterochloroform): multiplets at 5.72–5.18δ(4H), 4.30–3.70δ (4H), 3.70–3.28δ (4H), 3.12–2.75δ (2H); triplet at 1.0–0.73δ (3H); singlet at 4.82–4.56δ (2H). IR (KBr tablet): $\nu_{max}$: 1200 cm$^{-1}$, 1185 cm$^{-1}$, 1038 cm$^{-1}$, 1023cm$^{-1}$. TLC (using a 5:1 mixture of methylene chloride and methanol as eluent); Rf = 0.43.

The (4-sodium sulphonato-n-butyl)triphenylphosphonium bromide employed in this Example is prepared as follows:

Sodium 4-bromo-n-butanesulphonate (33g) and triphenylphosphine (85g) were dissolved in N,N-dimethyl-formamide (400 ml) and the solution stirred for 10 hours at 125°C. The mixture was concentrated in vacuo and the residue treated with diethyl ether and the ethereal layer removed by decantation. The ether washing procedure was repeated several times to remove unreacted triphenylphosphine and the residue was purified by column chromatography on silica gel using a 6:1 mixture of methylene chloride and methanol as eluent to give (4-sodium sulphonato-n-butyl)-triphenylphosphonium bromide (27g; 39%) as white crystals, m.p. 268°–280°C. NMR (deuterium oxide): multiplets at 3.60–3.20δ(2H), 2.42–1.50δ(4H); triplet at 3.20–2.80δ(2H); doublet at 8.30–7.50δ(15H). IR (KBr tablet): $\nu_{max}$: 1210cm$^{-1}$, 1180cm$^{-1}$, 1038cm$^{-1}$ Elemental analysis: Found: C,52.59; H,4.56; S, 6.32%; $C_{22}H_{23}O_3BrPSNa$ requires C,52.73; H, 4.62; S,6.39%. TLC (using a 5:1 mixture of methylene chloride and methanol as eluent); Rf = 0.70.

EXAMPLE 2

Sodium 6-[2β-{3α-(2-tetrahydropyranyloxy)-oct-trans-l-enyl}-3α-(2-tetrahydropyranyloxy)-5α-hydroxycyclopent-1α-yl]-hexanesulphonate A solution of sodium 6-[2β-{3α-(2-tetrahydropyranyloxy)-oct-trans-l-enyl}-3α-(2-tetrahydropyranyloxy)-5α-hydroxycyclopent-1α-yl]hex-cis-4-enesulphonate (prepared as in Example 1) (1.08g) in methanol (60 ml) was catalytically reduced with hydrogen and 5% palladium on carbon (170 mg) at ambient temperature and atmospheric pressure. Removal of the catalyst and concentration of the solvent gave sodium 6-[2β-{3α-(2-tetrahydropyranyloxy)-oct-trans-l-enyl}-3α-(2-tetrahydropyranyloxy)-5α-hydroxy-cyclopent-1α-yl]hexanesulphonate (913mg).

A part of this product was subjected to hydrolysis in a small amount of the mixture of 1% trifluoroacetic acid and methanol at 20°C. for several minutes. The hydrolysis product was subjected to thin layer chromatography on silica gel impregnated with silver nitrate using a 2:50 mixture of acetic acid and an upper layer of ethyl acetate, acetic acid, isooctane, methanol and water (110:10:10:15:100) as a developing solvent.

6-[2β-{3α(2-tetrahydropyranyloxy)-oct-trans-l-enyl}-3α-(2-tetrahydropyranyloxy)-5α-hydroxycyclopent-1α-yl]-hex-cis-4-enesulphonate was subjected to hydrolysis and thin layer chromatography in a similar manner as above.

Rf values of hydrolysis products were 0.26 and 0.17, respectively.

EXAMPLE 3

Synthesis of sodium 6-[2β-(3α-hydroxy-oct-trans-l-enyl)-3α,5α-dihydroxycyclopent-1α-yl]-hex-cis-4-enesulphonate To a solution of sodium 6-[2β-{3α-(2-tetrahydropyranyloxy)-oct-trans-l-enyl}3α-(2-tetrahydropyranyloxy)-5α-hydroxy-cyclopent-1α-yl]hex-cis-4-enesulphonate (prepared as described in Example 1) (312mg) in methanol (5ml) several drops of trifluoroacetic acid were added. The mixture was stirred at 19°C for 30 minutes and concentrated in vacuo. The residue was subjected to column chromatography on silica gel using a 4:1 mixture of methylene chloride and methanol as eluent to give sodium 6-[2β-(3α-hydroxy-oct-trans-l-enyl)-3α,5α-dihydroxycyclopent-1α-yl]-hex-cis-4-enesulphonate (84mg) as white crystals, m.p. 122°–125°C. NMR (in deuteromethanol): multiplets at 5.68–5.28δ(4H), 4.31–3.72δ (3H), 2.95–2.68δ (2H); triplet at 1.03–0.77δ (3H). Elemental analysis: Found: C.47.72; H 8.29; S,7.07%; $C_{19}H_{33}O_6SNa.2.5\ H_2O$ requires C,47.68; H, 8.37; S, 7.01%. TLC (using a 4:1 mixture of methylene chloride and methanol as solvent); Rf = 0.257.

EXAMPLE 4

Synthesis of sodium 6-[2β-(3α-hydroxy-oct-trans-l-enyl)-3α,5α-dihydroxycyclopent-1α-yl]hexanesulphonate Using the experimental conditions described in Example 3, sodium 6-[2β-{3α-(2-tetrahydropyranyloxy)-oct-trans-l-enyl}-3α-(2-tetrahydropyranyloxy)-5α-hydrocyclopent-1α-yl]hexanesulphonate (prepared as in Example 2) (283mg) gave sodium 6-[2β-(3α-hydroxy-oct-trans-l-enyl)-3α,5α-dihydroxycyclopent-1α-yl]hexanesulphonate (59mg) as a white powder, m.p. 182°–183°C. IR (KBr tablet: $\nu_{max}$: 1190cm⁻¹, 1060 cm⁻¹. NMR: multiplets at 5.71–5.39δ(2H), 4.28–3.74δ(3H), 2.97–2.67δ(2H); triplet at 1.01–0.75δ(3H). TLC (using a 4:1 mixture of methylene chloride and methanol as solvent); Rf = 0.26.

EXAMPLE 5

Sodium 6-[2β-(3α-hydroxy-oct-trans-l-enyl)-3α-hydroxy-5-oxo-cyclopent-1α-yl]hex-cis-4-enesulphonate To a solution of sodium 6-[2β-{3α-(2-tetrahydropyranyloxy)oct-trans-l-enyl}-3α-(2-tetrahydropyranyloxy)-5α-hydroxycyclopent-1α-yl]hex-cis-4-enesulphonate (prepared as described in Example 1) (766mg) in acetone (33ml) was added Jones' reagent (1.8ml) (prepared by dissolving chromium trioxide (2.67g) and sulphuric acid (2.3ml) in water and making up the total volume with water to 10ml), which had been cooled to −20°C, and the mixture stirred at −20 to −15°C for 4 hours. Isopropyl alcohol was added to decompose the excess of Jones' reagent and the reaction mixture diluted with brine and extracted with ethyl acetate. The organic layer was washed with brine, dried over sodium sulphate and concentrated in vacuo. The residue (628mg) in methanol (5ml) was treated with 0.3ml of 1N hydrochloric acid and the mixture stirred at 27°C, for 1.5 hours, neutralised (to about pH 7) with sodium bicarbonate and concentrated in vacuo at a low temperature. The residue was subjected to column chromatography on silica gel using a 4:1 mixture of methylene chloride and methanol as eluent to give sodium 6-[2β-(3α-hydroxy-oct-trans-l-enyl)-3α-hydroxy-5-oxo-cyclopent-1α-yl]hex-cis-4-enesulphonate (204mg), m.p. 83°–84°C. NMR (in deuteromethanol): multiplets at 5.58–5.27δ(4H), 4.13–3.67δ(2H), 2.96–2.55δ(3H), triplet at 1.03–0.67δ(3H). TLC(using a 3:1 mixture of methylene chloride and methanol as solvent); Rf = 0.192.

EXAMPLE 6

Sodium 6-[2β-(3α-hydroxy-oct-trans-l-enyl)-3α-hydroxy-5-oxo-cyclopent-1α-yl]hexanesulphonate To a solution of 6-[2β-{3α-(2-tetrahydropyranyloxy)-oct-trans-l-enyl}-3α-(2-tetrahydropyranyloxy)-5α-hydroxy-cyclopent-1α-yl]hexanesulphonate (prepared as in Example 2) (592mg) in acetone (28ml) at −20°C, was added Jones' reagent (prepared as described in Example 5) (1.5ml) dropwise, and the mixture stirred at −20° to −15°C, for 3.5 hours. Isopropyl alcohol was added to decompose the excess of Jones' reagent and the reaction mixture diluted with a small amount of brine and extracted with ethyl acetate. The organic layer was washed with brine, dried over sodium sulphate, and concentrated under reduced pressure. The residue (497mg) was dissolved in methanol (6ml), treated with 1N hydrochloric acid (0.36ml) and stirred at 27°C. for 1.5 hours. The mixture was neutralised (ca.pH 7) with sodium bicarbonate and concentrated in vacuo at low temperature. The residue was subjected to column chromatography on silica gel using a 4:1 mixture of methylene chloride and methanol as eluent to give sodium 6-[2β-(3α-hydroxy-oct-trans-1-enyl)-3α-hydroxy-5-oxo-cyclopent-1α-yl]hexanesulphonate (173mg). NMR (in deuteromethanol): multiplets at 5.69–5.38δ(2H), 4.25–3.74δ(2H), 2.94–2.56δ(3H); triplet at 1.03–0.77δ(3H). TLC (using a 3:1 mixture of methylene chloride and methanol as solvent); Rf = 0.20.

EXAMPLE 7

Sodium -(3α-hydroxyoct-trans-1-enyl)-5-oxo-cyclopent-3-en-1α-yl]hex-cis-4-enesulphonate A solution of sodium 6-[2β-(3α-hydroxyoct-trans-1-enyl)-3α-hydroxy-5-oxo-cyclopent-1α-yl]hex-cis-4-enesulphonate (prepared as in Example 5) (64mg) in 90% aqueous acetic acid (5ml) was stirred at 55°–60°C. for 16 hours. The reaction mixture was concentrated in vacuo and the residue dissolved in ethyl acetate, washed with brine and the organic layer concentrated in vacuo. The residue was subjected to column chromatography on silica gel using a 5:1 mixture of methylene chloride and methanol as eluent to give sodium 6-[2β-(3α-hydroxyoct-trans-1-enyl)-5-oxo-cyclopent-3-en-1α-yl]hex-cis-4-enesulphonate (42mg) as a solid, m.p. 80°–81°C. NMR (in deuteromethanol): multiplets at 5.75–5.52δ(2H), 5.52–5.25δ(2H), 4.27–3.96δ(1H), 3.43–3.18δ(1H), 2.97–2.71δ(2H); quartets at 7.68–7.52δ(1H), 6.3–6.12δ(1H); triplet at 1.02–0.75δ(3H).

EXAMPLE 8

Sodium 6-[2β-(3α-hydroxyoct-trans-1-enyl)-5-oxo-cyclopent-3-en-1α-yl]hexanesulphonate In a similar manner to that described in Example 7 for the preparation of sodium 6-[2β-(3α-hydroxyoct-trans-1-enyl)-5-oxo-cyclopent-3-en-1α-yl]hex-cis-4-enesulphonate, sodium 6-[2β-(3α-hydroxyoct-trans-1-enyl)-3α-hydroxy-5-oxo-cyclopent-1α-yl]hexanesulphonate (prepared as in Example 6) (41mg) gave sodium 6-[2β-(3α-hydroxyoct-trans-1-enyl)-5-oxo-cyclopent-3-en-1α-yl]hexanesulphonate (31mg). NMR (in deuteromethanol): multiplets at 5.73–5.54δ(2H), 4.25–4.0δ(1H), 3.37–3.15δ(1H), 2.95–2.7 (2H); quartets at 7.65–7.51δ(1H), 6.28–6.1δ(1H); triplet at 1.01–0.75δ(3H).
TLC (using a 3:1 mixture of methylene chloride and methanol as solvent); Rf = 0.392.

The present invention includes within its scope pharmaceutical compositions which comprise at least one new therapeutically useful compound of general formula (I), or cyclodextrin clathrate or non-toxic salt thereof, together with a pharmaceutical carrier or coating. In clinical practice the new compounds of the present invention will normally be administered orally, rectally or parenterally.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Solid compositions for vaginal administration include pessaries formulated in manner known per se and containing one or more of the active compounds.

Solid compositions for rectal administration include suppositories formulated in manner known per se and containing one or more of the active compounds.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also include adjuvants such as preserving, wetting, emulsifying and dispersing agents. They may be sterilised, for example, by filtration through a bacteria-retaining filter, by incorporation of sterilising agents in the compositions or by irradiation. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025% by weight of active substance when required for administration by injection; for oral administration the preparations will normally contain at least 0.1% by weight of active substance. The dose employed depends upon the desired therapeutic effect, the route of administration and the duration of the treatment.

In the adult, the doses are generally between 0.2 μg and 20 μg/kg body weight by oral administration in the prevention and treatment of hyperlipidaemic states, in the prevention and treatment of elevated blood levels of free fatty acids and in the treatment of diabetes, between 500 and 1000 μg/kg body weight by intravenous administration in the induction of labour in pregnant females and about 1000 μg/kg body weight by oral administration in the treatment of intestinal dyskinesia and post-operative intestinal paralysis and in the prevention and treatment of constipation.

The following Examples illustrate pharmaceutical compositions according to the present invention.

EXAMPLE 9

Sodium 6-[2β-(3α-hydroxyoct-trans-1-enyl)-3α,5α-dihydroxycyclopent-1α-yl]hex-cis-4-enesulphonate (50mg) was dissolved in water (150 ml.). The solution was then sterilised by passage through a bacteria-retaining filter and placed in 15ml. portions in 50ml. ampoules, to give 5mg. of sodium 6-[2β-(3α-hydroxyoct-trans-l-enyl)-3α,5α-dihydroxycyclopent-1α-yl]hex-cis-4-enesulphonate per ampoule. The contents of the ampoules were freeze-dried and the ampoules sealed. The contents of an ampoule in a suitable volume, e.g. 20ml., of sterile water or physiological saline gave a solution ready for administration by injection.

EXAMPLE 10

Sodium 6-[2β-(3α-hydroxyoct-trans-l-enyl)-3α,5α-dihydroxycyclopent-1α-yl]hexanesulphonate (20mg.) was dissolved in ethanol (10ml.), mixed with mannitol (18.5g.), sieved through a 30-mesh sieve, dried at 30°C, for 90 minutes and again sieved through a 30-mesh sieve, Aerosil (microfine silica; 200mg.) was added and the powder obtained was machine-filled into one hundred No. 2 hard gelatin capsules to give capsules each containing 200 βg. of sodium 6-[2β-(3α-hydroxyoct-trans-l-enyl)-3α,5α-dihydroxycyclopent-1α-yl]hexanesulphonate which after swallowing of the capsules is released into the stomach.

We claim:
1. A compound of the general formula:

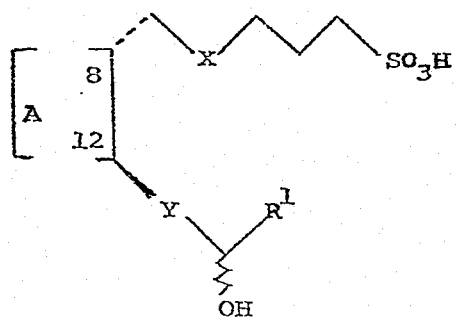

wherein A represents a grouping of the formula:

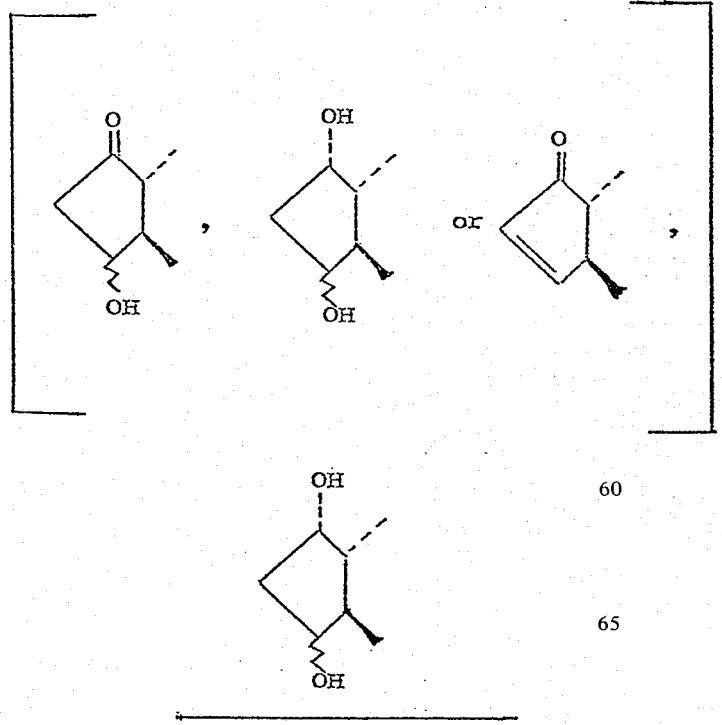

X represents cis-vinylene or ethylene, Y represents trans-vinylene or ethylene, $R^1$ represents a straight- or branched-chain alkyl group containing from 5 to 7 carbon atoms, and indicates attachment of the hydroxy radical to the carbon atom in the alpha or beta configuration or the corresponding cyclodextrin clathrates and non-toxic salts thereof.

2. A compound according to claim 1 wherein $R^1$ represents an n-pentyl group.

3. A compound according to claim 1 wherein the hydroxy radicals are in the alpha configuration.

4. A compound according to claim 1 wherein X represents cis-vinylene or ethylene and Y represents trans-vinylene or X and Y each represent ethylene.

5. A compound according to claim 1 wherein X represents cis-vinylene and Y represents ethylene.

6. A compound according to claim 1 which is 6-[2β-(3α-hydroxy-oct-trans-l-enyl)-3α,5α-dihydroxycyclopent-1α-yl]hex-cis-4-enesulphonic acid, cyclodextrin clathrates of the acid, or non-toxic salts of the acid.

7. A compound according to claim 1 which is 6-[2β-(3α-hydroxy-oct-trans-l-enyl)-3α,5α-dihydroxycyclopent-1α-yl] hexanesulphonic acid, cyclodextrin clathrates of the acid, or non-toxic salts of the acid.

8. A compound according to claim 6 which is sodium 6-[2β-(3α-hydroxy-oct-trans-l-enyl)-3α,5α-dihydroxycyclopent-1α-yl]hex-cis-4-enesulphonate.

9. A compound according to claim 7 which is sodium 6-[2β-(3α-hydroxy-oct-trans-l-enyl)-3α,5α-dihydroxycyclopent-1α-yl]hexanesulphonate.

* * * * *